United States Patent
Chen et al.

(10) Patent No.: US 10,630,125 B2
(45) Date of Patent: Apr. 21, 2020

(54) ROTOR WITH MAGNET PROTECTION MECHANISM

(71) Applicant: HIWIN MIKROSYSTEM CORP., Taichung (TW)

(72) Inventors: Yung-Fu Chen, Taichung (TW); Cheng-Xun Pan, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 174 days.

(21) Appl. No.: 15/807,186

(22) Filed: Nov. 8, 2017

(65) Prior Publication Data

US 2019/0140510 A1    May 9, 2019

(51) Int. Cl.
*H02K 1/27*    (2006.01)
*H02K 1/28*    (2006.01)
*H02K 1/26*    (2006.01)

(52) U.S. Cl.
CPC ............... *H02K 1/28* (2013.01); *H02K 1/265* (2013.01); *H02K 1/27* (2013.01); *H02K 1/2773* (2013.01)

(58) Field of Classification Search
None
See application file for complete search history.

(56) References Cited

U.S. PATENT DOCUMENTS

| 9,680,341 | B2 * | 6/2017 | Takeda | H02K 1/2766 |
|---|---|---|---|---|
| 9,893,575 | B2 * | 2/2018 | Kawamura | H02K 1/276 |
| 2011/0156521 | A1 * | 6/2011 | Nagashima | H02K 1/2766 310/156.28 |
| 2013/0187485 | A1 * | 7/2013 | Sakamoto | H02K 1/148 310/43 |
| 2015/0303751 | A1 * | 10/2015 | Ekin | H02K 1/2773 310/43 |
| 2015/0318744 | A1 * | 11/2015 | Ekin | H02K 1/2773 310/156.56 |
| 2018/0069443 | A1 * | 3/2018 | Han | H02K 1/27 |
| 2018/0323667 | A1 * | 11/2018 | Lee | H02K 1/24 |

* cited by examiner

*Primary Examiner* — Dimary S Lopez Cruz
(74) *Attorney, Agent, or Firm* — Muncy, Geissler, Olds & Lowe, P.C.

(57) ABSTRACT

The present invention provides a rotor with magnet protection mechanism comprising a core, a plurality of magnets and a magnet protection mechanism. The core comprises a plurality of slots in a radial arrangement, and the magnets are held within the slots. The magnet protection mechanism is set against the core and comprises a plurality of segments corresponding to the slots in a circular configuration.

9 Claims, 9 Drawing Sheets

FIG.11

ROTOR WITH MAGNET PROTECTION MECHANISM

BACKGROUND OF THE INVENTION

Field of the Invention

The invention relates to a rotor, and more particularly to a rotor with magnet protection mechanism.

Description of the Related Art

Rotary permanent magnet motor is primarily divided into interior permanent magnet motor and surface permanent magnet motor wherein the interior permanent magnet motor is widely applied to the machine tools due to its superior constant power speed range.

With respect to the magnet installation of the interior permanent magnet motor, there are two considerations including the magnet fixation before the curing of the glue, and the protection for the magnet escape during the rotation with high speed. Besides, the permanent magnet motor vibrates due to the ripple resulted from the cogging torque such that the reliability of the magnet during the rotation with high speed becomes a difficult challenge.

Although the conventional permanent magnet motor provides protrusions configured within the slots of the rotor to prevent from the radial escape of the magnets, the mutually exclusive force between the magnets would result in the vertical escape during the operation. For the safety during the operation, the firm fixation of the magnets within the rotor preventing from the radial or vertical escape of the magnets is the priority for the design of the permanent magnet motor.

SUMMARY OF THE INVENTION

In view of the disadvantages of prior art, the object of the present invention is to provide a rotor with magnet protection mechanism to prevent the magnets from the vertical escape.

To achieve the above object, the present invention provides a rotor with magnet protection mechanism comprising a core, a plurality of magnets and a magnet protection mechanism. The core comprises a plurality of slots in a radial arrangement, and the magnets are held within the slots. The magnet protection mechanism is set against the core and comprises a plurality of segments corresponding to the slots in a circular configuration.

In one embodiment of the present invention, each segment comprises two assembly portions configured at two opposite ends of each segment respectively. The two assembly portions are engaged with the corresponding assembly portions of contiguous segment.

In one embodiment of the present invention, the rotor with magnet protection mechanism comprises a fixture with a plurality of first linking holes, a ring with a plurality of second linking holes and a plurality of connecting units. The fixture is located at one end of the core and partially within the core. The ring is set against the other end of the core. The core comprises a plurality of through holes, and the connecting units are secured within the first linking holes, the through holes and the second linking holes.

In one embodiment of the present invention, the ring comprises an outer diameter larger than an inner diameter of the core to provide a gap between the ring and the core.

In one embodiment of the present invention, each segment comprises a plurality of fastening portions facing an axle of the core whereby the assembly portions and the fastening portions are positioned within the gap.

In one embodiment of the present invention, the magnet protection mechanism comprises a space between the engaged assembly portions.

In one embodiment of the present invention, the magnet protection mechanism comprises a plurality of washers and a plurality of locking units secured within a plurality of locking holes of the washer and a plurality of positioning holes of the segment.

In one embodiment of the present invention, the number of the segments comprises 2, 3 or 4.

In one embodiment of the present invention, the connecting units are bolts or screws wherein the first linking holes, the through holes and the second linking holes are screw holes when the connecting units are screws.

Therefore, the magnet protection mechanism of the present invention is assembled as a whole in a circular configuration by connecting multiple segments, and set against the core to correspond to the slots thereby preventing the magnets from the vertical escape. Besides, the separate segments are connected through the engagement of the assembly portions wherein the assembly portions and the fastening portions are positioned within the gap between the ring and the core to provide the convenience and efficiency of the assembly.

DETAILED DESCRIPTION OF THE PREFERRED EMBODIMENTS

Refer to FIG. 1 to FIG. 5. The rotor 10 with magnet protection mechanism includes a core 20, a plurality of magnets 30, a magnet protection mechanism 40, a fixture 50, a ring 60 and a plurality of connecting units 70.

Figure 1:
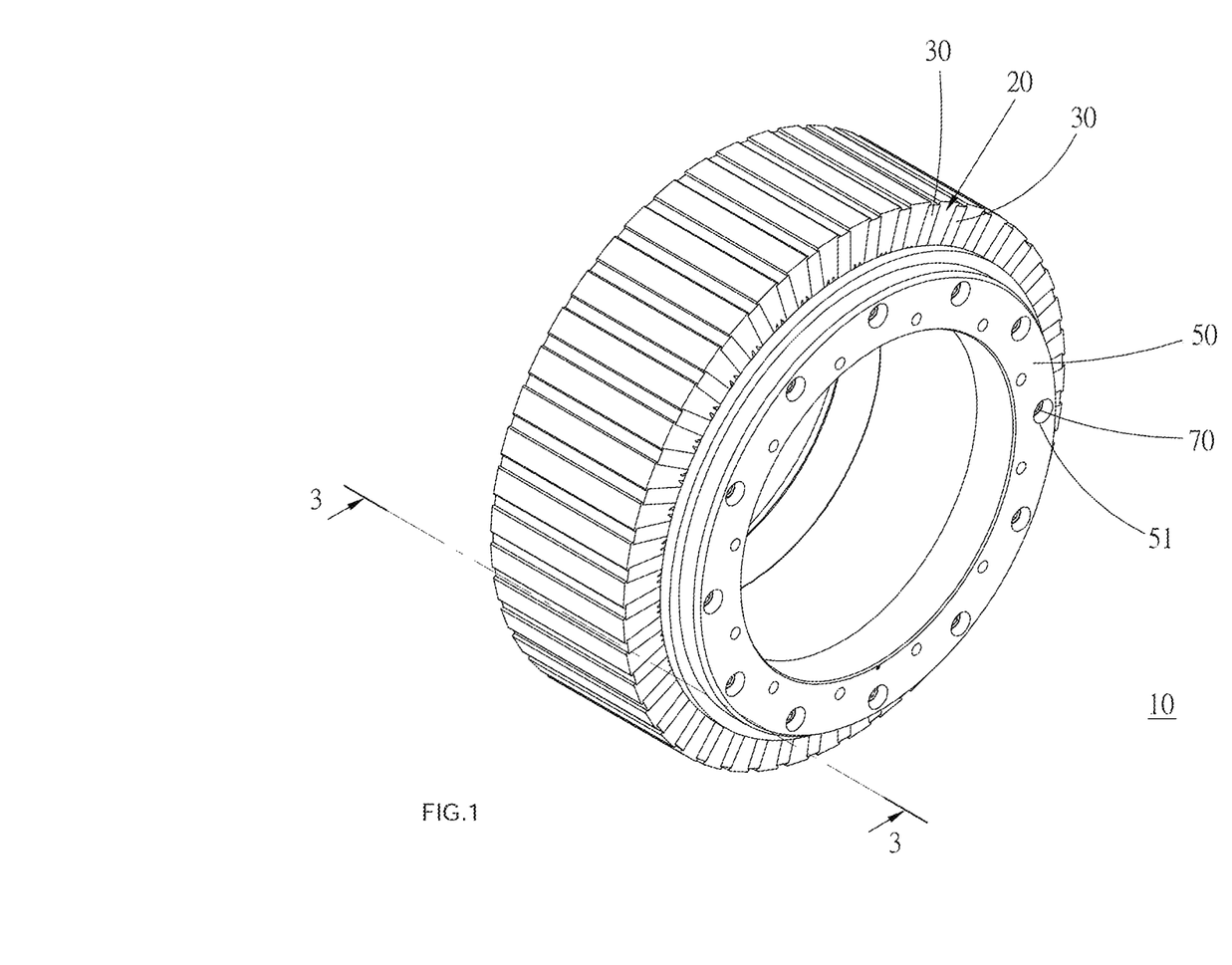
FIG. 1 is a schematic view of the rotor with magnet protection mechanism according to the first embodiment of the present invention.
Figure 2:
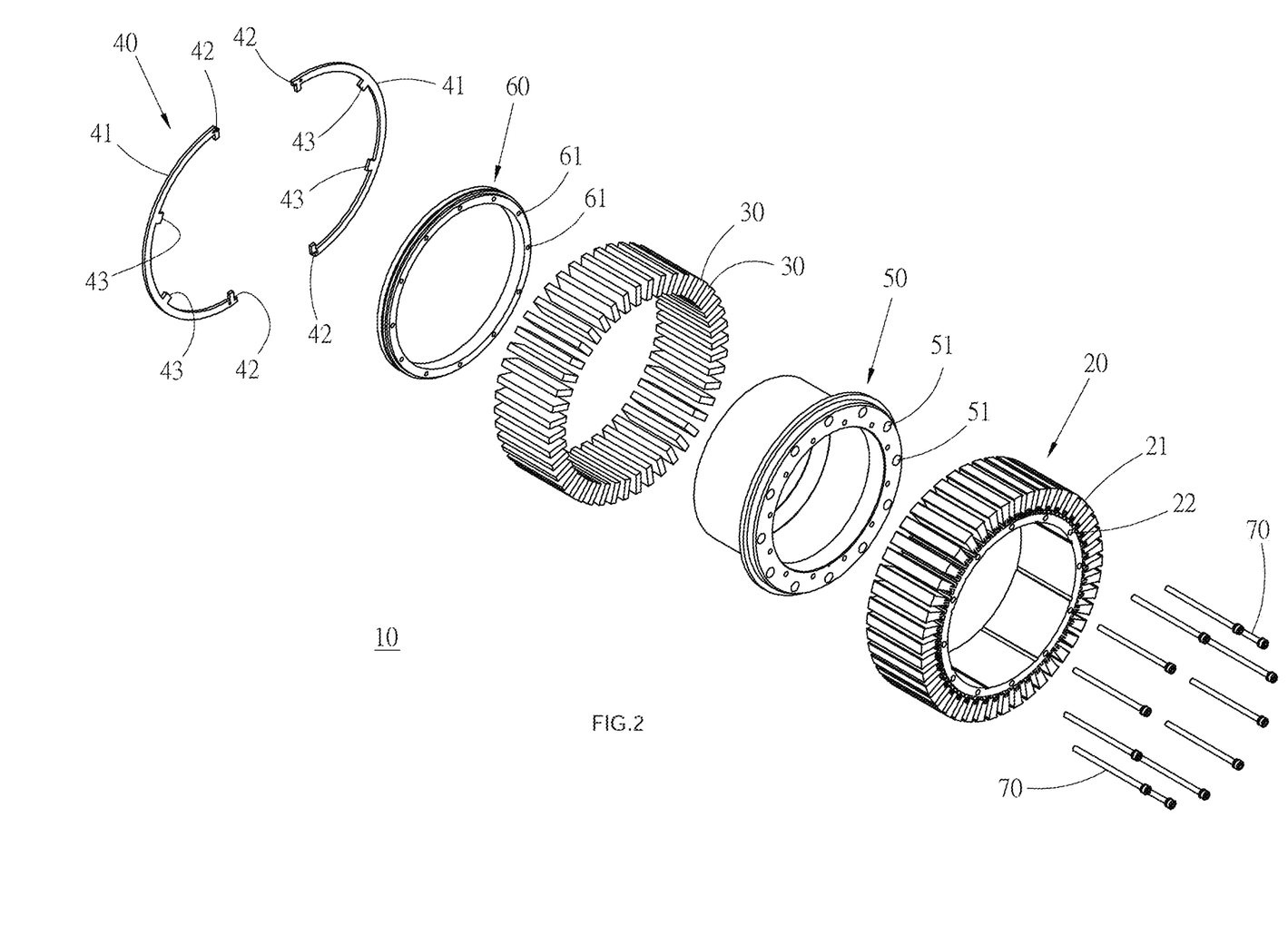
FIG. 2 is an exploded view of the rotor with magnet protection mechanism according to the first embodiment of the present invention.
Figure 3:
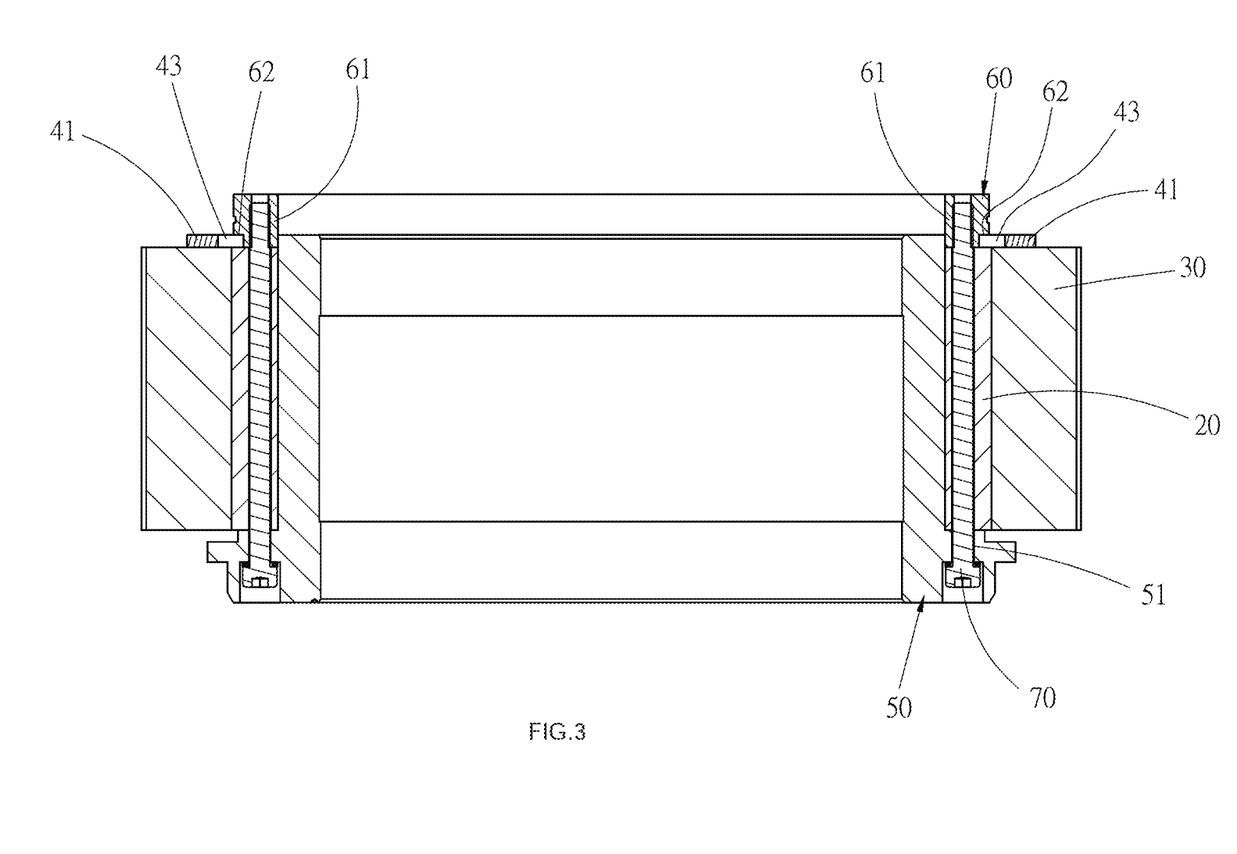
FIG. 3 is a cross sectional view of the rotor with magnet protection mechanism along the line 3-3 of FIG. 1.

The core 20 includes a plurality of slots 21 and through holes 22 wherein the slots 21 are configured on the outer circumference of the core 20 in a radial arrangement and the through holes 22 are configured on the inner circumference of the core 20 in a radial arrangement. The magnets 30 are held within the slots 21.

The fixture 50 is located at one end of the core 20 and partially within the core 20. The ring 60 is set against the other end of the core 20. The fixture 50 includes a plurality of first linking holes 51, and the ring 60 includes a plurality of second linking holes 61 wherein the first linking holes 51 and the second linking holes 61 correspond to the through holes 22 of the core 20. The connecting units 70 are secured within the first linking holes 51, the through holes 22 and the second linking holes 61 to fasten the core 20 between the fixture 50 and the ring 60 for assembly. In this embodiment, the connecting units 70 are bolts. In other embodiment, the connecting units 70 are screws and the first linking holes 51, the through holes 22 and the second linking holes 61 are screw holes to provide another design selection.

Figure 4:
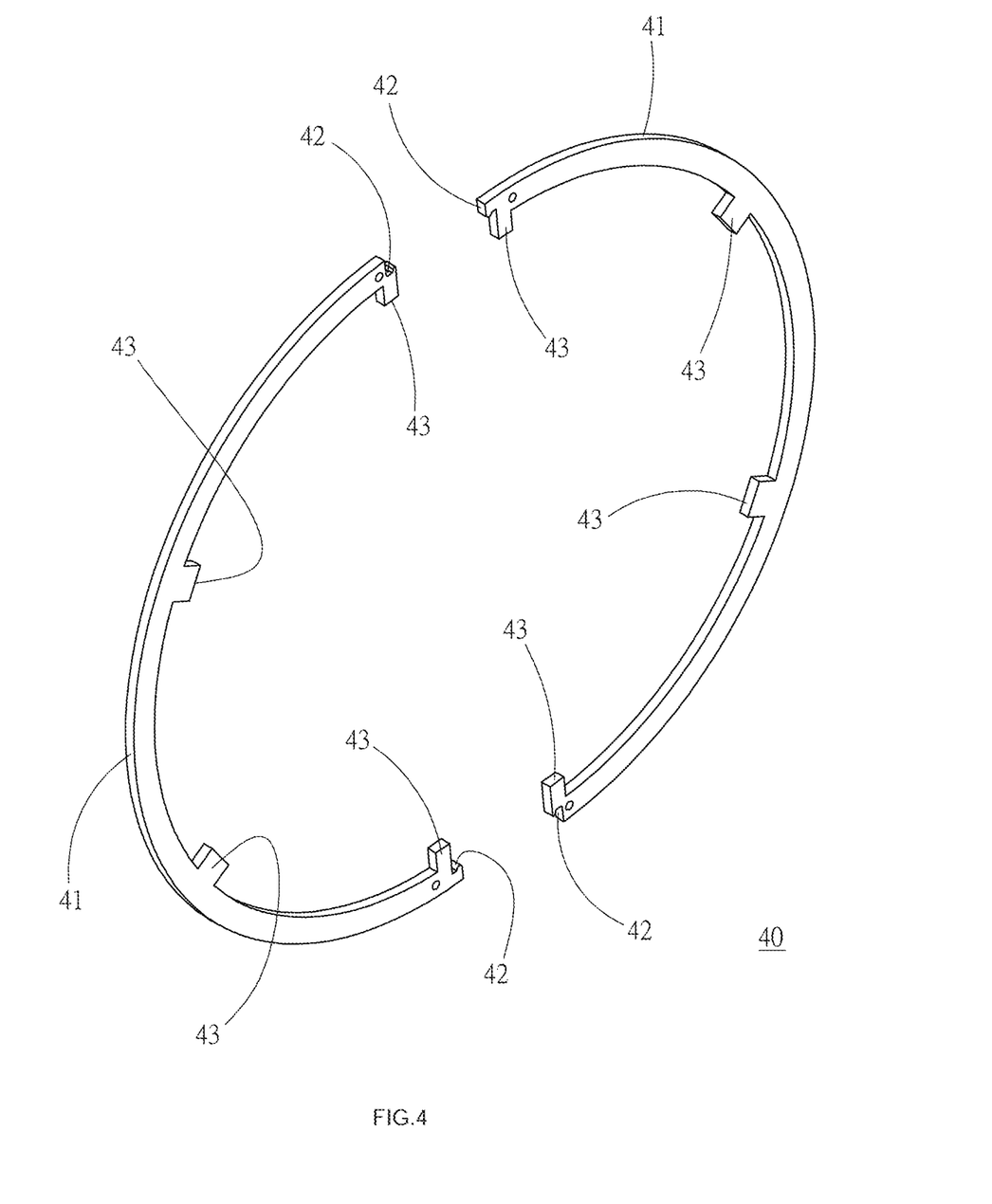
FIG. 4 is a schematic view of the magnet protection mechanism according to the first embodiment of the present invention.
Figure 5:
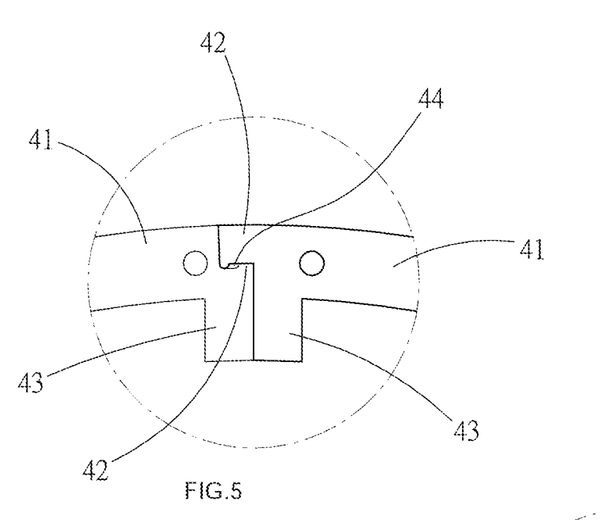
FIG. 5 is a partial plan view of the magnet protection mechanism according to the first embodiment of the present invention.

Refer to FIG. 4 to FIG. 5. The magnet protection mechanism 40 is set against the core 20 and corresponds to the slots 21 in a circular configuration to prevent the magnets 30 from being escaping from the slots 21 vertically. The magnet protection mechanism 40 includes two segments 41 wherein each segment 41 includes two assembly portions 42 and a plurality of fastening portions 43. The assembly portions 42 are configured at two opposite ends of each segment 41 respectively, and the fastening portions 43 are configured to face an axle of the rotor 10.

Figure 6:
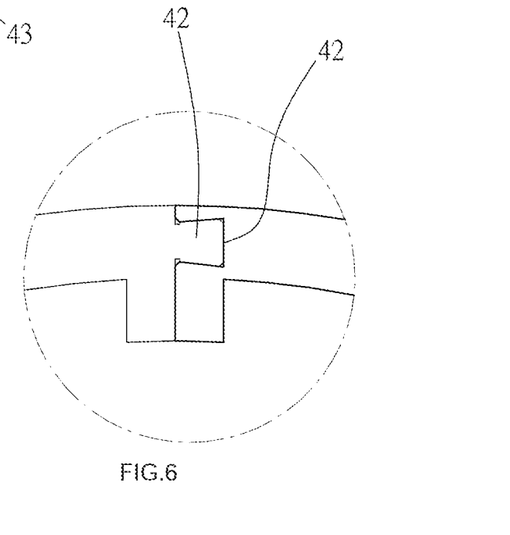
FIG. 6 is a partial plan view of the magnet protection mechanism according to other embodiment of the present invention.
Figure 7:
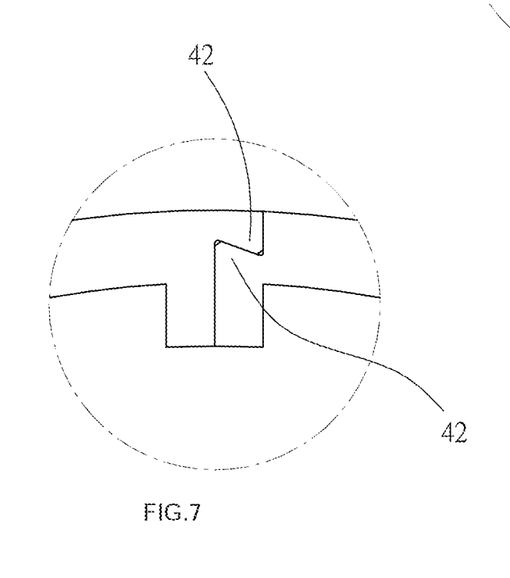
FIG. 7 is a partial plan view of the magnet protection mechanism according to other embodiment of the present invention.

In this embodiment, the two assembly portions 42 are engaged with the corresponding assembly portions 42 of contiguous segment 41. The magnet protection mechanism 40 includes a space 44 between the engaged assembly portions 42 to provide the convenience and efficiency for assembly. The structure of the assembly portions 42 on the segments 41 is not limited in the above embodiment, and can be the dovetail or bevel structure (refer to FIG. 6 and FIG. 7).

The ring 60 includes an outer diameter larger than an inner diameter of the core 20 to provide a gap 62 between the ring 60 and the core 20. The assembly portions 42 and the fastening portions 43 are positioned within the gap 62 such that the magnet protection mechanism 40 is secured on the core 20. Accordingly, the magnet protection mechanism 40 is assembled through the engagement of the assembly portions 42, and secured on the core 20 through the fastening portions 43 held within the gap 62 such that the magnet protection mechanism 40 can be firmly secured on the core 20 during the rotation with high speed.

Figure 8:
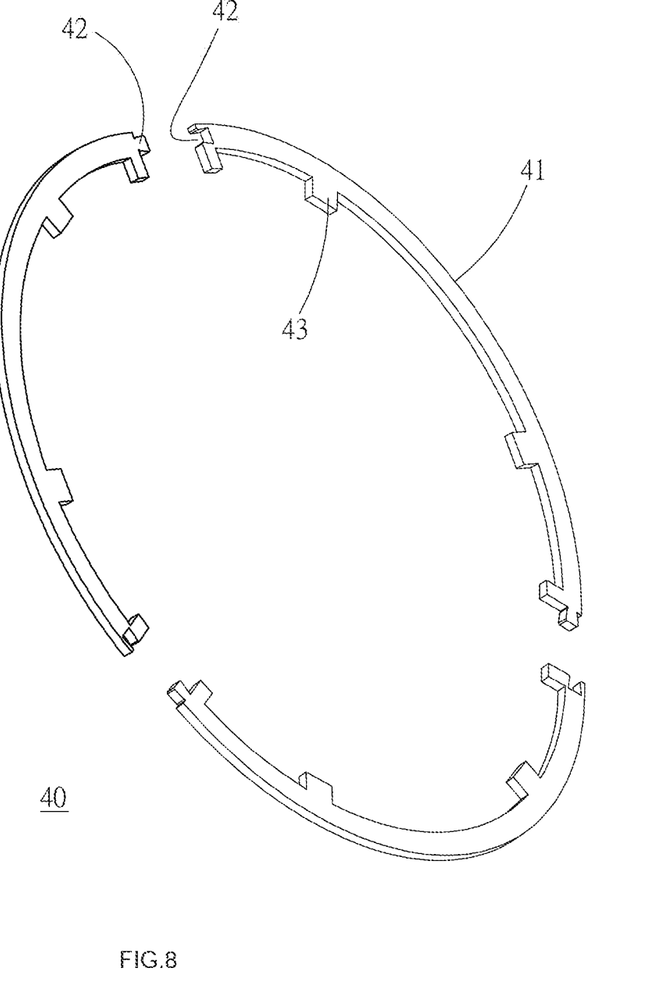
FIG. 8 is a schematic view of the magnet protection mechanism according to other embodiment of the present invention.
Figure 9:
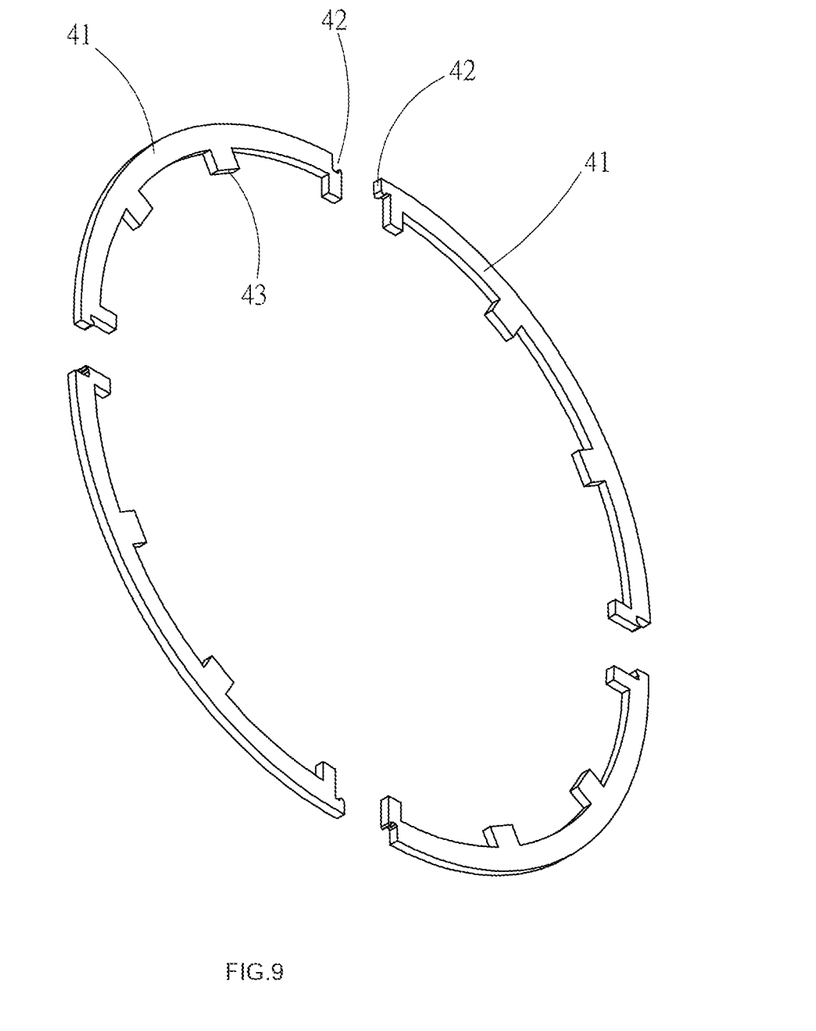
FIG. 9 is a schematic view of the magnet protection mechanism according to other embodiment of the present invention.

In this embodiment, the magnet protection mechanism 40 includes two segments 41. In other embodiments, the magnet protection mechanism 40 includes three or four segments 41 according to the size of the rotor 10 (refer to FIG. 8 and FIG. 9). The assembly portions 42 of the segment 41 in other embodiments are the same as that of the first embodiment, so there is no more detailed description herein.

Figure 10:
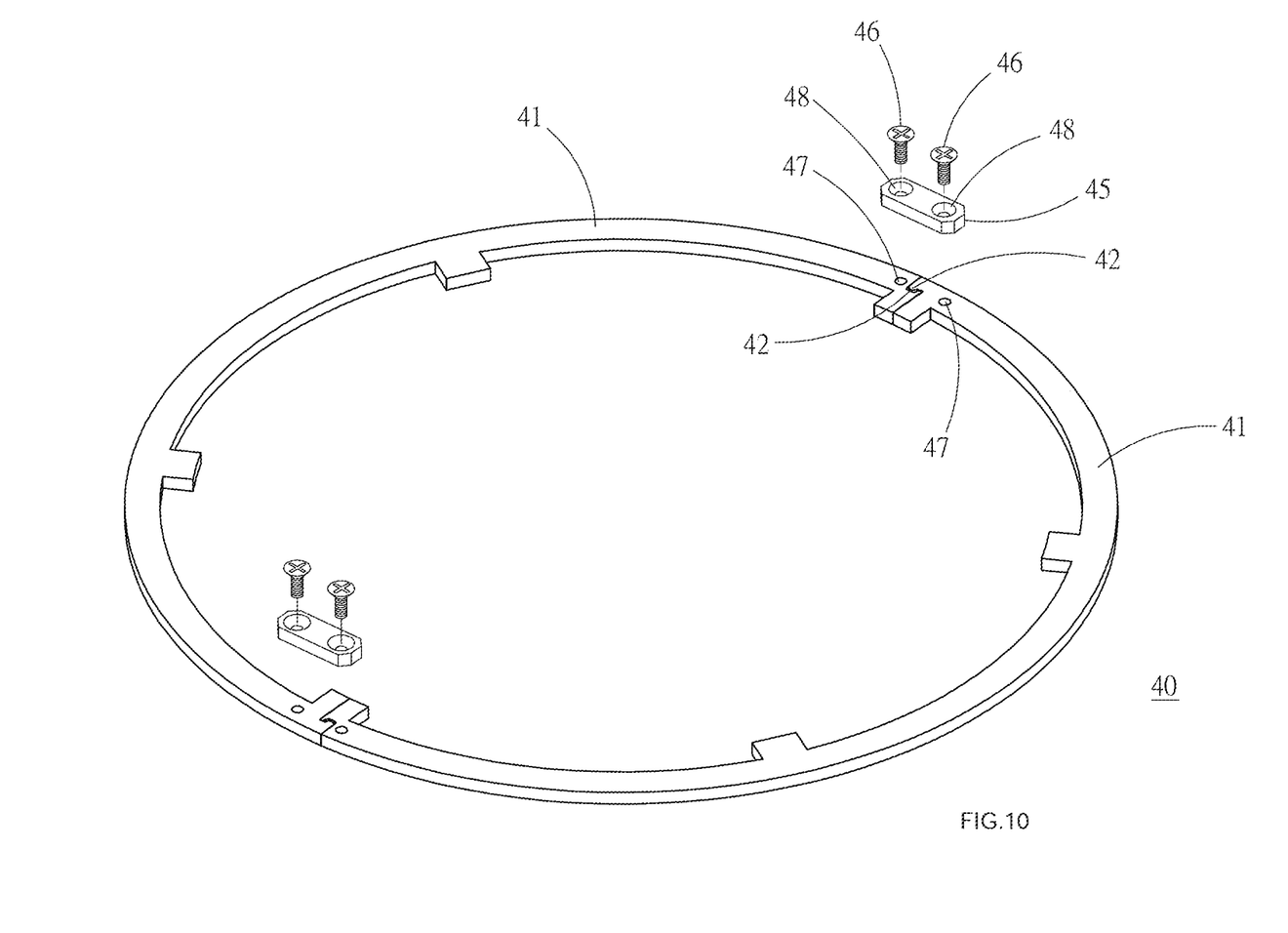
FIG. 10 is an exploded view of the magnet protection mechanism according to other embodiment of the present invention.
Figure 11:
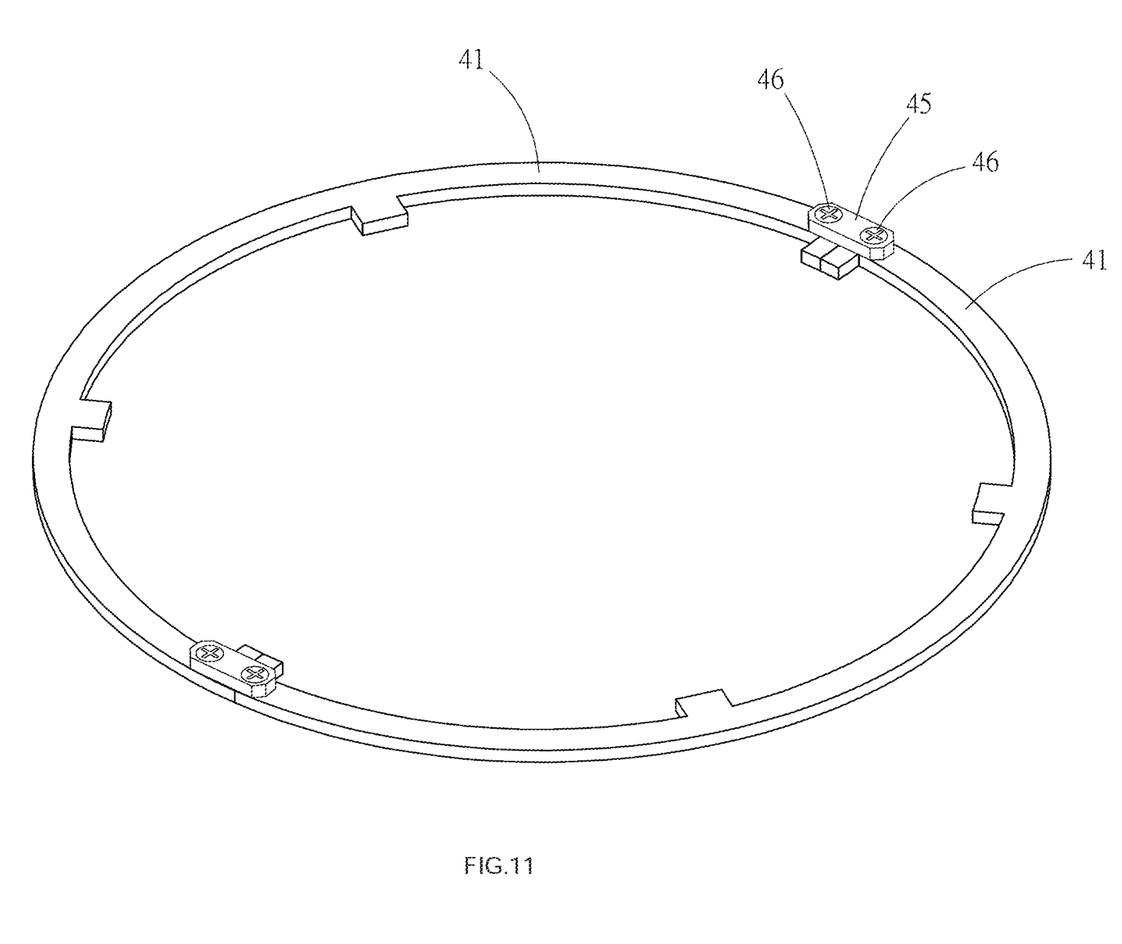
FIG. 11 is a schematic view of the magnet protection mechanism according to other embodiment of FIG. 10.

Refer to FIG. 10 and FIG. 11. In addition to the engagement means through the assembly portions 42, the magnet protection mechanism 40 further includes other engagement means with a plurality of washers 45 and a plurality of locking units 46 to enhance the connection strength thereof. Specifically, each segment 41 includes two positioning holes 47 adjacent to the assembly portions 42, and each washer 45 includes two locking holes 48 corresponding to the positioning holes 47 whereby the locking units 46 are secured within the positioning holes 47 and the locking holes 48. Therefore, the magnet protection mechanism 40 includes various engagement means to provide the convenience and connection strength for assembly.

Consequently, the rotor 10 with magnet protection mechanism of the present invention includes the following advantages:

Compared with the protrusions configured within the slots of the rotor preventing the magnets from the radial escape, the magnet protection mechanism 40 of the present invention is assembled as a whole in a circular configuration by connecting multiple segments 41, and set against the core 20 to correspond to the slots 21 thereby preventing the magnets from the vertical escape.

The separate segments 41 are connected through the engagement of the assembly portions 42 wherein the assembly portions 42 and the fastening portions 43 are positioned within the gap 62 between the ring 60 and the core 20 to provide the convenience and efficiency of the assembly.

What is claimed is:

1. A rotor with magnet protection mechanism, comprising:
   a core, comprising a plurality of slots in a radial arrangement;
   a plurality of magnets, held within the slots; and
   a magnet protection mechanism, set against the core and comprising a plurality of segments corresponding to the slots in a circular configuration,
   wherein each segment comprises two assembly portions configured at two opposite ends of each segment respectively: the two assembly portions are engaged with the corresponding assembly portions of contiguous segment.

2. The rotor with magnet protection mechanism as claimed in claim 1, further comprising a fixture with a plurality of first linking holes, a ring with a plurality of second linking holes and a plurality of connecting units wherein the fixture is located at one end of the core and partially within the core, the ring is set against the other end of the core, and the core comprises a plurality of through holes whereby the connecting units are secured within the first linking holes, the through holes and the second linking holes.

3. The rotor with magnet protection mechanism as claimed in claim 2, wherein the ring comprises an outer diameter larger than an inner diameter of the core to provide a gap between the ring and the core.

4. The rotor with magnet protection mechanism as claimed in claim 3, wherein each segment comprises a plurality of fastening portions facing an axle of the core whereby the assembly portions and the fastening portions are positioned within the gap.

5. The rotor with magnet protection mechanism as claimed in claim 2, wherein the connecting units are bolts.

6. The rotor with magnet protection mechanism as claimed in claim 2, wherein the connecting units are screws and the first linking holes, the through holes and the second linking holes are screw holes.

7. The rotor with magnet protection mechanism as claimed in claim 1, wherein the magnet protection mechanism comprises a space between the engaged assembly portions.

8. The rotor with magnet protection mechanism as claimed in claim 1, wherein the magnet protection mechanism comprises a plurality of washers and a plurality of locking units secured within a plurality of locking holes of the washer and a plurality of positioning holes of the segments.

9. The rotor with magnet protection mechanism as claimed in claim 1, wherein the number of the segments comprises 2, 3 or 4.

\* \* \* \* \*